No. 860,899. PATENTED JULY 23, 1907.
M. BUCHERER.
ENGINE WITH ROTARY CYLINDERS.
APPLICATION FILED MAR. 18, 1907.

Witnesses:
R. Fischer
M. Rensch.

Inventor:
Max Bucherer
By: R. F. Hopper
Attorney

UNITED STATES PATENT OFFICE.

MAX BUCHERER, OF ELBERFELD, GERMANY.

ENGINE WITH ROTARY CYLINDERS.

No. 860,899.   Specification of Letters Patent.   Patented July 23, 1907.

Application filed March 18, 1907. Serial No. 363,104.

*To all whom it may concern:*

Be it known that I, MAX BUCHERER, engineer and manufacturer, a subject of the King of Prussia, German Emperor, and residing at No. 31–39 Arndtstrasse, of Elberfeld, in the Kingdom of Prussia, German Empire, have invented new and useful Improvements in Driving Mechanism for Piston-Engines with Rotary Cylinders, of which the following is a specification.

The use of piston engines with rotary cylinders is already known and also it is no longer new to interpolate between the driving crank, of piston engines with fixed cylinders, and the driven shaft a wheel mechanism for overcoming the dead point positions.

The object of the present invention consists, however, in the application of such a wheel mechanism in piston engines with rotary cylinders, thus necessitating a modified arrangement of the wheel mechanism.

The object of the invention is shown in the accompanying drawings in which:—

Figure 1:
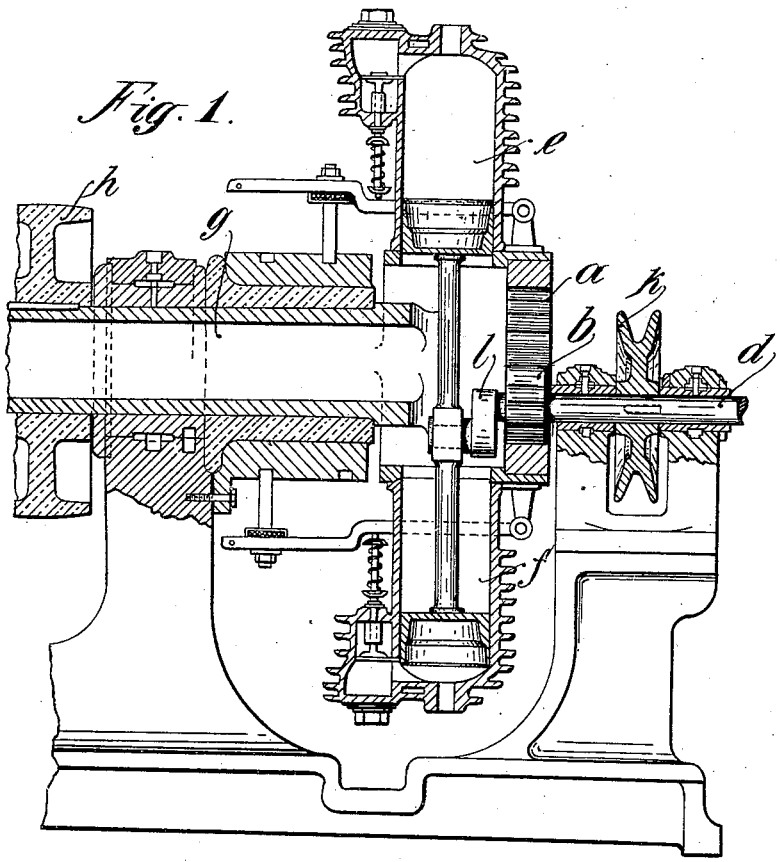
Figure 2:
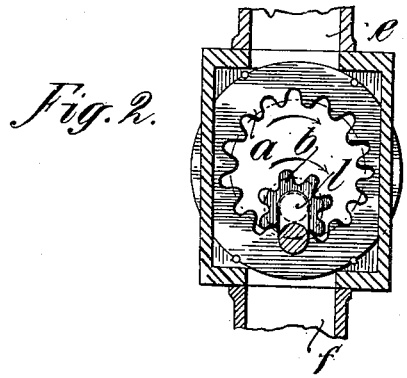

Figure 1 is a longitudinal section of the engine with a pair of rotary cylinders; Fig. 2, is a cross sectional view of Fig. 1.

This drawing shows two toothed wheels $a$ $b$ one inside the other of which the internally toothed wheel $a$ is connected with the rotary cylinders $e$ and $f$, while the other wheel $b$ with external toothing is firmly connected with the driven crank shaft $d$. The diameters of the wheels are in the proportion of 1:2 to one another, and the diameter of the wheel with internal toothing is equal to the entire cylinder movement, while the small face wheel $b$ is equal in diameter to the diameter of the crank circle and double the axial difference between the crank axis $d$ and the cylinder axis $g$, and stands in engagement therewith. Now if the engine be caused to rotate by explosive gas, the pistons exert their force on the single crank $l$ which rotates at half the speed of the cylinders, simultaneously with the displacement of the two pistons and rotation of the cylinders by means of a bearing or eyelet connecting the two toothed wheels. The power transmitted from the pistons to the crank and shaft $d$ is now transmitted by the small belt pulley $k$ as useful work. As the power exerted by each motor undergoes a constant fluctuation during the working, if the power were directly transmitted to the crank shaft, cylinders with a cylindrical axis would have a tendency to leading and lagging, which would be apparent by the piston heads pressing against the cylinder walls. The consequence of this would be that after a short time of working the cylinder walls and the piston heads would undergo great wear, and also the effective power of the motor, in consequence of these frictional losses, and also of the defective packing of the pistons, would be considerably diminished. The crank shaft, which rotates with the crank pins, would also have to be considerably stronger for transmitting these pressures, and would be exposed to a strong bending strain. In order to avoid these drawbacks by means of toothed wheels, on the one hand the proportions of transfer from the crank to the cylinder axis must amount to 1:2 and on the other hand the course of the crank pin in each position must move on the middle axis of the perforation of the two cylinders corresponding to the movement of the pistons and piston rods. The irregularities hereby arising in the generation and development of power are absorbed by the toothed wheels.

In Fig. 1, $e$ and $f$ are two revolubly mounted cylinders lying opposite one another, $g$ the hollow axis of the same with keyed on belt pulley $h$. The crank axle $d$ with crank $l$ is revolubly mounted eccentrically to the hollow axis $g$ in its continuation, and a small belt pulley $k$ keyed on the crank axle, so that either the one or the other or both belt pulleys may be simultaneously used as desired as driving pulley. The small toothed wheel $b$ is keyed on the crank axle $d$ and the large toothed wheel $a$ brought into revoluble engagement with the wheel $b$ concentrically to the cylinder axis $g$, both toothed wheels are therefore revoluble on their middle axis. When the motor has been started, the crank-shaft $d$ is rotated by the action of the piston and piston-rods upon the crank $l$, and thus also the toothed wheel $b$ being in engagement with the toothed wheel $a$ is rotated, so that the cylinders $e$ and $f$ being connected with the wheel $a$ revolve around, and rotate with the half speed of rotation of the shaft $d$. On the stoppage of the motor if the gearing were not present, the possibility would arise that owing to the impetus of the rotary cylindrical mass at the moment when the crank pin remains standing in the center of the hollow axis $g$ of the cylinder, the former would make a further rotation and only come to a standstill in a position from which a rotation of the motor system could no longer take place.

The special advantages of the arrangement are therefore:—1. To prevent the pair of cylinders on the stoppage of the crank pin in the center of the cylinder hollow axis turning beyond this, and instead of taking up a position tangential to the crank circuit assuming a radial position thereto. 2. Where a pair of cylinders is used, as in the form of example shown, the arrangement of the wheels $a$ and $b$ avoid any cross-reaction of the crank pin of the crank $l$ upon the connecting-piece of the piston-rods so that a bent of the rods is prevented. 3. No cranked shaft is necessary in the arrangement, but only a simple end crank. 4. The arrangement allows of the toothed wheel with simple cranks and counter cranks having a much larger stroke and also of a better utilization of the gas and the entire mechanism of the engine. 5. As the pistons reciprocate in a straight line and receive no pressure from the piston rods, the former may be made almost as short as steam pistons, so that the length of the cylinders is utilized much better than formerly.

Having now described my invention, that what I wish to secure by Letters Patent of the United States, is:

In a piston-engine with revoluble cylinder; the combination with said cylinder of an internally toothed wheel firmly connected with said cylinder, and a cog-wheel arranged inside said first-mentioned wheel and connected with a crank-shaft lying eccentrically from the axis of rotation of the cylinder.

In witness whereof I have hereunto set my hand in presence of two witnesses.

MAX BUCHERER.

Witnesses:
 WOLDEMAR HAUPT,
 HENRY HASPER.